US005332623A

United States Patent [19]

Dethlefs

[11] Patent Number: 5,332,623

[45] Date of Patent: Jul. 26, 1994

[54] PHOTOGRAPHIC SUPPORT MATERIAL

[75] Inventor: Ralf-Burkhard Dethlefs, Osnabruck, Fed. Rep. of Germany

[73] Assignee: Felix Schoeller jr. Papierfabrik GmbH & Co. KG, Osnabruck, Fed. Rep. of Germany

[21] Appl. No.: 63,281

[22] Filed: May 18, 1993

[30] Foreign Application Priority Data

May 23, 1992 [DE] Fed. Rep. of Germany ....... 4217196

[51] Int. Cl.⁵ ........................ B32B 5/16

[52] U.S. Cl. ........................ 428/326; 428/327; 428/511; 430/538

[58] Field of Search ................ 430/538; 428/326, 327, 428/511

[56] References Cited

U.S. PATENT DOCUMENTS

| | | | |
|---|---|---|---|
| 3,501,298 | 3/1970 | Crawford | 430/538 |
| 4,407,896 | 10/1983 | Kubbota et al. | 430/538 |
| 4,442,200 | 4/1984 | Asao | 430/538 |
| 4,699,874 | 10/1987 | Kitagawa et al. | 430/538 |
| 4,794,071 | 12/1988 | Tomko et al. | 430/538 |
| 4,801,509 | 1/1989 | Uno et al. | 430/538 |
| 4,859,539 | 8/1989 | Tomko et al. | 430/538 |
| 5,075,196 | 12/1991 | Daems et al. | 430/538 |
| 5,178,936 | 1/1993 | Kamiya et al. | 430/538 |
| 5,198,330 | 3/1993 | Martic et al. | 430/538 |

FOREIGN PATENT DOCUMENTS 1176825 1/1970 United Kingdom .

OTHER PUBLICATIONS

Ullmanns *Encyclopadie Der Technischen Chemie,* vol. 13, pp. 635-638 (1962).

*Primary Examiner*—Jack P. Brammer
*Attorney, Agent, or Firm*—Lockwood, Alex, Fitzgibbon & Cummings

[57] ABSTRACT

A photographic support material includes a base paper and at least one polyolefin layer arranged on the base paper and containing titanium dioxide, and a methyl substituted chinacridone red pigment in the polyolefin which is a chinolino (2,3-b) acridine-7,14-dione-5,12-dihydro-3,10-dimethyl.

5 Claims, No Drawings

PHOTOGRAPHIC SUPPORT MATERIAL

BACKGROUND AND DESCRIPTION OF THE INVENTION

The present invention relates to a photographic support material which is coated with a water resistant, pigment containing polyolefin layer.

Water resistant, photographic support materials generally comprise a sized base paper preferably coated on both sides with water resistant polyolefin resin layers. More particularly, the polyolefin resin layers usually comprise polyethylene and are applied to the paper by extrusion coating (J. Appl. Photographic Engineering 5, 1979, pp. 110–117). One or more photographic layers are applied to one of the polyolefin resin layers (the front side layer) following pretreatment of the layer surface in order to improve adhesion. These photographic layers may be layers used for black and white as well as color photography, and other ancillary layers may also be included. The front side layer usually contains a light reflecting, white pigment, for example $TiO_2$, $BaSO_4$, ZnO and others, as well as colorants or colored pigments and other additives, such a dispersing agents, optical brighteners, release agents, slip additives, antioxidants, antistatic agents, etc.

The resin layer on the other side (the back side layer), i.e. the side of paper opposite to the light sensitive layers, is preferably non-pigmented. Yet it can contain pigments and other additives, which result from the use of coated paper as photographic support material, and which can fundamentally correspond to those in the front side layer.

Additional functional layers may be positioned between the front side layer and the actual photographic layers. These functional layers improve the adhesion of the photographic layers, for example, or may fulfill other functions contingent upon the use of the material.

The back side layer can also be coated with additional functional layers which, for example, improve the writing properties, conductivity, flatness or other properties of the support material.

As a rule the front side polyolefin layer comprises a low density polyolefin (e.g. LDPE), while the back side layer comprises predominantly a high density polyolefin (e.g. HDPE) (J. Appl. Photographic Engineering 7, 1981, p. 71).

The coating of photographic base papers with polyolefin in general is accomplished as a melt film coating using extrusion coating apparatus with a slot die. Auxiliary layers and additional functional layers may be applied by means of any known application procedures using separate coating steps or equipment as well as those which are "in line".

It is generally known that the design of photographic support materials in various aspects is determined by considerations of taste. This applies for example to the toning of the base paper and the front layer with small amounts of colorants or coloring pigments. The colorants or coloring pigments used for the materials must be compatible with the photographic emulsion and must not diffuse either from the polyolefin layer into the light sensitive photographic emulsion layer or from the polyolefin layer into the base paper. In addition, these materials should be light and heat resistant.

Blue pigments may be added to the polyolefin layer the latter of which contains $TiO_2$, such as ultramarine blue (in a mixture with $SiO_2$, $Al_2O_3$ and $Na_2O$), cobalt blue (cobalt oxide and aluminum hydroxide) and/or magenta pigments, such as cobalt phosphate oxides or colorants of the chinacridone type. By way of example, U.S. Pat. No. 3,501,298 describes a red pigment on a chinacridone base. A disadvantage of the latter pigment is that it has inadequate heat stability. At temperatures above 300° C., thermal decomposition of the pigment takes place so that the decomposition products which are generated may cause formation of bubbles and lead to a so called "lacing effect" in the polyolefin layer during the extrusion coating process. Additionally, color alteration takes place.

Thus, the purpose of the present invention is to produce a photographic support material comprising a base paper and a polyolefin coating containing a white pigment and coloring pigments, and in which the pigmented polyolefin layer shows no color changes, and its surface is uniform and devoid of bubbles and holes, i.e. lacing effect.

This purpose is achieved in the present invention by a chinacridone base red pigment in the polyolefin layer which is a methyl substituted chinacridone, especially a chinolino (2,3-b) acridine-7, 14-dione-5,12-dihydro-3,10-dimethyl. Surprisingly, it has been found that pigment particles of a size $>100$ nm, a density of $<1.4$ g/cm$^3$ and having a specific surface of $<65$ m$^2$/g (measured by the BET method) are particularly advantageous in realizing the purpose of the invention. The particles are preferably rod or plate shaped. The amount of red pigment preferred in the invention is between 0,001 and 0.01% by weight with reference to the polyolefin coating.

The polyolefin resin used for the polyolefin coating can be for example polyethylene, polypropylene or an olefin copolymer, either alone or in a mixture. However, polyethylene is preferred, which can be used in its higher density form (HDPE), lower density form (LDPE) or as a mixture of both forms. An ethylene/alpha-olefin copolymer, the so called LLDPE, can also be used.

The polyolefin coating of the invention can contain up to 20% by weight of a white pigment. Titanium dioxide (rutile or anatase form) is preferred. A mixture of titanium dioxide with another white pigment or filler may also be used. Moreover, the coating may contain small amounts of other coloring pigments, colorants, optical brightening agents or other known additives.

The polyolefin coating can be applied to one or both sides of the base paper. The application is carried out by means of extrusion coating using a slot die and at a temperature range between 190° and 360° C.

The base paper which is to be coated with the polyolefin coating according to the invention can be any arbitrary photographic base paper which either is neutrally sized with alkylketene dimer, or which has a known acid sizing on the base from precipitated resin or fatty acid soaps. The base paper may be formed of cellulose fibers or of a mixture of cellulose fibers and synthetic fibers. It can have a basis weight of 60 to 300 g/m$^2$, preferably 70 to 200 g/m$^2$, and in addition it can be surface sized.

It was quite unexpected that no disadvantages were noted using the above described red pigment regarding its heat stability during extrusion coating, as well as no "bleeding" of the pigment into the polyolefin layer, because chinacridone base pigments described in the state of the art always show these disadvantages.

The invention is more fully described in the following examples.

EXAMPLE 1

A photographic base paper, sized with alkyl ketene dimer and of 160 $g/m^2$ weight, was subjected to Corona radiation and then coated with a polyethylene coating mass of the following composition.

- 87.07% by weight LDPE (d=0,923 $g/cm^3$, MFI=4.4)
- 12.83% by weight $TiO_2$ (Anatase form, Kronos 1014)
- 0,002% by weight red pigment (PV-Echtrosa E, by Hoechst)
- 0.10% by weight ultramarine blue (Color index 77007)

The red pigment was chinolino (2,3-b) acridine - 7,14-dione-5,12-dihydro-3,10-dimethyl, d<1.4 $g/m^3$, size of the pigment particle of >100nm, and specific surface by BET <65 $m^2/g$.

The extrusion coating was performed at three different temperature ranges:

| Temperature °C. | I | II | III |
|---|---|---|---|
| Input of the extruder | 190 | 190 | 190 |
| Mixing zone | 260 | 280 | 310 |
| Extrusion die | 310 | 335 | 360 |

EXAMPLE 2

The photographic base paper of Example 1 was coated as in that example with a polyethylene mass of the following composition:

- 66.89% by weight LDPE (d =0.923 $g/cm^3$, MFI =4.4 )
- 20.00% by weight HDPE (d =0.959 $g/cm^3$, MFI =8 )
- 13.00% by weight $TiO_2$ (Anatase form, Kronos 1014)
- 0.01% by weight red pigment (PV-Echtrosa E, by Hoechst)
- 0.10% by weight Ultramarine (Color Index 77007)

REFERENCE EXAMPLE 1

The photographic base paper of Example 1 was coated as in that example with a polyethylene coating mass of the following composition:

- 87.07% by weight LDPE (d =0.923 $g/cm^3$, MFI =4.4)
- 12.83% by weight $TiO_2$ (Anatase form, Kronos 1014)
- 0.002% by weight red pigment (Hostaperm Pink E, by Hoechst)
- 0.10% by weight Ultramarine (Color Index 77007)

The red pigment was a chinacridone pigment with a particle size of <95 nm, d =1.4–1.45 $g/cm^3$ and specific surface by the BET method of >70 $m^2g$.

REFERENCE EXAMPLE 2

The photographic base paper of Example 1 was coated as in that example with a polyethylene coating mass of the following composition:

- 87.07% by weight LDPE (d =0.923 $g/cm^3$, MFI =4.4)
- 12.83% by weight $TiO_2$ (Anatase form, Kronos 1014)
- 0.002% by weight red pigment (PV-19 Color Index 46500)
- 0.10% by weight Ultramarine The red pigment was an unsubstituted chinacridone.

TESTING OF PHOTOGRAPHIC SUPPORT MATERIALS

The following tests were preformed on the support materials of Examples 1 and 2 and Reference Examples 1 and 2.

1) Color Measurement According to DIN 6174.

According to this procedure color tint is determined by values L, a and b. The value L denotes luminosity, the greater the numerical value, the greater the luminosity. The value a denotes a reddish color, the greater the numerical value, the more pronounced the reddish color. Should the value a be negative, the reddish color is inadequate, and a greenish color predominates. The value b indicates a yellowish color, the greater the numerical value, the more pronounced the yellowish color. With negative b values, the color is bluish. When a and b are zero, the measured object is colorless.

The L, a, and b values were obtained both immediately after coating and after a 24 hour illumination of the sample with a xenon lamp.

2) Surface Testing of the Sample.

The sample was evaluated visually and examined for the presence of holes.

Test Results

| | Example 1 | Example 2 | Example Ref. 1 | Example Ref. 2 |
|---|---|---|---|---|
| Temperature range I | | | | |
| L | 93.2 | 89.1 | 93.0 | 92.8 |
| L* | 93.2 | 89.1 | 93.1 | 92.9 |
| a | +0.3 | +4.9 | +0.3 | +0.3 |
| a* | +0.3 | +4.9 | +0.3 | +0.2 |
| b | −4.0 | −6.5 | −4.0 | −4.6 |
| b* | −4.0 | −6.5 | −4.0 | −4.4 |
| Surface quality | + | + | + | + |
| Temperature range II | | | | |
| L | 93.2 | 89.1 | 93.1 | 92.8 |
| L* | 93.2 | 89.1 | 93.3 | 92.9 |
| a | +0.3 | +4.9 | +0.3 | +0.2 |
| a* | +0.3 | +4.9 | +0.2 | +0.1 |
| b | −4.1 | −6.5 | −4.3 | −4.4 |
| b* | −4.1 | −6.5 | −4.4 | −4.0 |
| Surface quality | + | + | + | − |
| Temperature range III | | | | |
| L | 93.2 | 89.1 | 93.0 | 92.8 |
| L* | 93.2 | 89.1 | 93.2 | 92.9 |
| a | +0.2 | +4.8 | +0.3 | +0.1 |
| a* | +0.2 | +4.8 | +0.1 | +0.1 |
| b | −4.1 | −6.5 | −4.5 | −4.3 |
| b* | −4.1 | −6.4 | −4.1 | −4.0 |
| Surface quality | + | + | − | − |

*following 24-hour illumination with xenon lamp
+ good surface quality, no holes or cracks
− bad surface quality, presence of bubbles and cracks As can be seen in the table containing the test results, no color changes, as expressed by L,a,b, values, were determined in the samples prepared according to the invention. This fact has been noted for all three temperature ranges. Likewise, no color changes have been noted after the samples had been exposed to a xenon lamp for 24 hours. The surface of the samples prepared according to the invention appeared good with no bubbles or holes noted.

On the other hand, color deviations were noted in the samples prepared according to Reference Examples 1 and 2, especially at higher temperatures. The surface did not appear good, especially in Reference Example 2 where holes and bubbles were noted.

I claim:

1. A photographic support material comprising:

a photographic support base material;

at least one polyolefin layer on said base material and containing a white light reflecting pigment therein; and a methyl substituted chinacridone red pigment in said polyolefin layer, said red pigment comprising a chinolino (2,3-b) acridine-7,14-dione-5,12-dihydro-3,10-dimethyl having a particle size of >100 nm, a density of <1.4 g/$cm^3$, and a specific surface of <65 $m^2$/g as measured by the BET procedure.

2. The photographic support material of claim 1, wherein said red pigment is present in the amount of about 0.001–0.01% by weight.

3. The photographic support material of claim 1, wherein said white pigment is titanium dioxide.

4. The photographic support material of claim 2, wherein said white pigment is titanium dioxide.

5. The photographic support material of claim 1, wherein said base material is paper.

* * * * *

UNITED STATES PATENT AND TRADEMARK OFFICE

CERTIFICATE OF CORRECTION

PATENT NO. : 5,332,623

DATED : Jul 26, 1994

INVENTOR(S) : Dethlefs

It is certified that error appears in the above-indentified patent and that said Letters Patent is hereby corrected as shown below:

Col. 2, line 31, delete "0,001" and insert --0.001--.

Col. 3, line 9, delete "0,923" and insert --0.923--.

Col. 3, line 12, delete "0,002" and insert --0.002--.

Col. 3, line 56, delete "$m^2g$" and insert --$m^2/g$--.

Col. 3, line 67, commence a new paragraph with "The".

Signed and Sealed this

Thirtieth Day of January, 1996

Attest:

Bruce Lehman

BRUCE LEHMAN

*Attesting Officer*

*Commissioner of Patents and Trademarks*